US007933813B2

(12) United States Patent  (10) Patent No.: US 7,933,813 B2
Barton                      (45) Date of Patent:     Apr. 26, 2011

(54) END-TO-END MANAGEMENT OF CARRIER SERVICES FOR ENTERPRISES AND RESELLERS

(75) Inventor: Christopher S. Barton, Parkland, FL (US)

(73) Assignee: Christopher S. Barton, Parkland, FL (US)

( * ) Notice: Subject to any disclaimer, the term of this patent is extended or adjusted under 35 U.S.C. 154(b) by 559 days.

(21) Appl. No.: 11/936,952

(22) Filed: Nov. 8, 2007

(65) Prior Publication Data

US 2009/0125409 A1    May 14, 2009

(51) Int. Cl.
G06Q 30/00    (2006.01)
(52) U.S. Cl. .................. 705/26.8; 705/26.81; 705/26.1; 705/27
(58) Field of Classification Search .................. 705/26, 705/27
See application file for complete search history.

(56) References Cited

U.S. PATENT DOCUMENTS

| 4,851,999 | A | 7/1989 | Moriyama |
| 6,885,997 | B1 | 4/2005 | Roberts |
| 6,957,186 | B1 | 10/2005 | Guheen et al. |
| 7,191,450 | B2 | 3/2007 | Gilfix et al. |
| 7,212,976 | B2 | 5/2007 | Scheer |
| 2001/0034627 | A1 | 10/2001 | Curtis et al. |
| 2001/0056362 | A1 | 12/2001 | Hanagan et al. |
| 2002/0052754 | A1* | 5/2002 | Joyce et al. ............. 705/1 |
| 2004/0143470 | A1 | 7/2004 | Myrick et al. |
| 2004/0237077 | A1 | 11/2004 | Cole et al. |
| 2005/0190901 | A1 | 9/2005 | Oborn et al. |
| 2005/0234777 | A1 | 10/2005 | Bird et al. |
| 2006/0059107 | A1 | 3/2006 | Elmore et al. |
| 2006/0074789 | A1 | 4/2006 | Capotosto et al. |
| 2006/0173775 | A1 | 8/2006 | Cullen, III et al. |
| 2006/0178973 | A1 | 8/2006 | Chiovari et al. |

(Continued)

FOREIGN PATENT DOCUMENTS

| JP | 2002-197247 | 7/2002 |
| JP | 2003-030349 | 1/2003 |
| JP | 2005-216013 | 8/2005 |
| JP | 2005-293201 | 10/2005 |

OTHER PUBLICATIONS

Vibe Communications Installs Genband M6 Applications Platform for VoIP and Multimedia Services. Wireless News , p. NA Sep. 27, 2007.*

*Primary Examiner* — Will Allen
*Assistant Examiner* — Resha Desai
(74) *Attorney, Agent, or Firm* — Brian K. Buchheit; Scott M. Garrett; Patents on Demand, P.A.

(57) ABSTRACT

The present invention provides a software based system for end-to-end handling of communication services that includes a set of Web based interfaces. The set of Web interfaces can permit a user to view, search and select a set of communication services of different providers, each service being presented with a real-time price for the service. Contracts can be automatically generated for selected ones of the communication services. The contracts can specify the real-time price for each service. An order status of the communication services can be monitored using the set of Web based interfaces. Invoices can be generated for the communication services. When different providers provide the communication services, a single integrated bill can be provided for services of the different providers. Usages of the communication services can be viewed online by selectable user categories, which decompose into per-user usage entries.

20 Claims, 3 Drawing Sheets

U.S. PATENT DOCUMENTS

| | | |
|---|---|---|
| 2006/0190391 A1 | 8/2006 | Cullen, III et al. |
| 2006/0218058 A1 | 9/2006 | Wojcik et al. |
| 2007/0016486 A1 | 1/2007 | Stone et al. |
| 2007/0033098 A1 | 2/2007 | Peters et al. |
| 2007/0136775 A1* | 6/2007 | MacKay et al. ............... 725/106 |
| 2007/0162308 A1 | 7/2007 | Peters |
| 2007/0203799 A1* | 8/2007 | Caballero et al. ............... 705/26 |
| 2008/0261593 A1* | 10/2008 | Wong et al. ................ 455/435.1 |

* cited by examiner

FIG. 1 (Prior Art)

| Reseller/Enterprise Table for Access to End-to-End System 260 ||||
| Requirements 262 | Benefits 264 | Minimums 266 | Compensation 268 |
| --- | --- | --- | --- |
| • Meet requirements as outlined in reseller agreement<br>• Consultant, integrator, equipment supplier, representative brokers with end-to-end system<br>• Point of contact relationship established<br>• Training program with end-to-end system<br>• Performs sales marketing efforts for day-to-day sales functions with client accounts<br>• Assume limited bad debt liability on services marketed<br>• Manage profit and loss via rate table<br>• * Provide optional customer services | • Access to end-to-end server and related services<br>• Training by end-to-end system professionals<br>• Aggressive revenue compensation on a wide variety of services and carriers<br>• Eligible to obtain support and resources from agents of end-to-end system<br>• Comprehensive local and long distance programs<br>• Level of participation during sales process determined by referral partner<br>• Nothing to purchase and no ongoing support required | • Must meet the annual revenue thresholds | • Up-front bonuses based on value of new contracts<br>• Ongoing residuals based on monthly billed revenue |

END-TO-END MANAGEMENT OF CARRIER SERVICES FOR ENTERPRISES AND RESELLERS

BACKGROUND

1. Field of the Invention

The present invention relates to automated systems for handling communication services and, more particularly, to end-to-end management of carrier services for enterprises and resellers (e.g., channel partners).

2. Description of the Related Art

Historically, telecommunications was controlled by a small set of carriers, who are referable as Incumbent Local Exchange Carriers (ILECs). The ILECs had monopolized the telecommunications market to an extent that end customers effectively had little choice but to pay whatever rates the ILECs chose to charge. In this environment, enterprises (e.g., business entities and campuses) began to lease a set of lines from an ILEC and use a private branch exchange (PBX) to perform local switching from the leased lines to dedicated lines connecting enterprise clients. Early PBXs (pre-1990), only permitted PBX's to connect to ILECs as end-users. Thus, customers were still forced to pay whatever line leasing rates the ILECs chose to charge.

In the early 1990's a few large cities, New York City being the first, enacted legislation that allowed ILEC teleport switches to connect as peers. This spawned local exchange competition and a creation of competitive local exchange carriers (CLECs). The telecommunication act of 1996 permitted national level competition for CLECs, which evolved into Competitive Access Carriers (CAPs). CLECs and CAPs began establishing their own lines connecting major hubs that minimized their leasing costs from ILECs.

Over time, convergence of technologies in the telecommunication space permitted communication sessions to be established using a variety of non-traditional infrastructure resources. For example, IP based communications permit voice channel communications using cable television resources, wireless resources, and the like. Traditional resources used for cable and satellite television, wireless telephony, and internet servers now merged with telecommunication resources so that any of these infrastructures can provide competing end-products. Legislation permitting cross-competition has ensured that an infrastructure owner is no longer siloed into providing only one type of service.

It is in this diverse environment that carrier service resellers or distributors emerged. Carrier resellers established contracts with one or more ILECs and CLECs. The distributors then packaged resources in a consumable form to enterprises, usually for a commission. Federal regulations and carrier requirements make it difficult for distributors to contract with multiple carriers, as each carrier generally requires minimum quantities that are difficult for diversified distributors to satisfy. Further, most carriers maintain identifying information visible to enterprises, so that when a lucrative enterprise exists for a distributor, it is relatively easy to circumvent the "middleman" distributor. Further, when a distributor becomes too dependent upon any particular carrier, that carrier is able to change its rates or contract specifics to the detriment of the distributor.

One very important element for telecom distributors and enterprises is the underlying management software infrastructure for telecom services. That is, an enterprise or end-user contracting with distributors must be billed for contracted services. This billing must be broken down in accordance with a contract and enterprises typically want a per-user, per-call break down of usages. End-users (e.g., enterprises) typically want a single, easy to understand bill, which can become difficult for a distributor to provide, when services are provided to the end-user from multiple carriers. Many other, currently manpower intensive, tasks are required of the telecom distributor, such as contract establishment and management, provisioning monitoring for new orders, managing costs verses profit, and the like. No software infrastructure exists to handle these aspects of the telecom procurement and utilization process.

Figure 1:
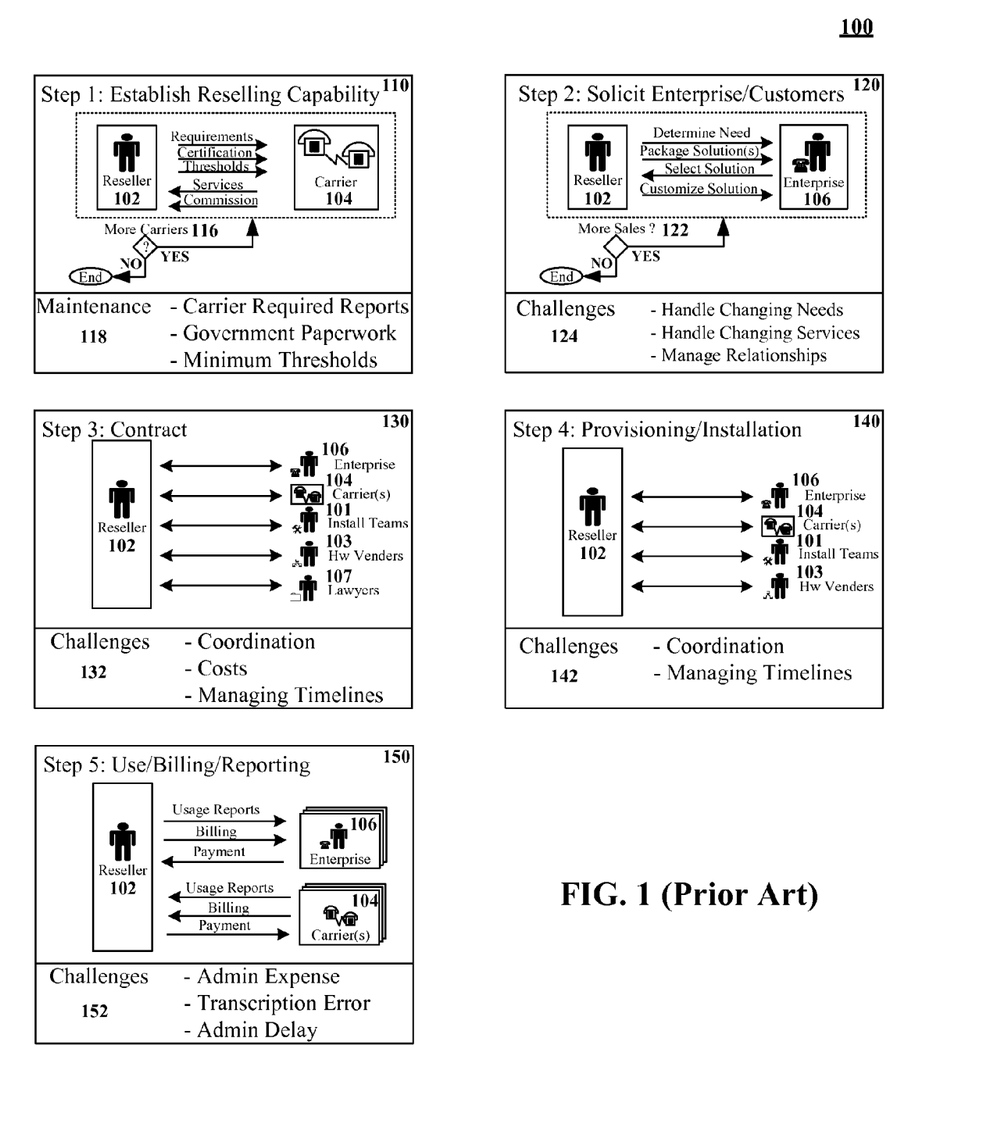
FIG. 1 (Prior Art) illustrates a scenario for traditionally reselling communication services.

A current state of the art can is pictorially illustrated by FIG. 1 (Prior Art). More specifically, FIG. 1 illustrates a scenario 100 for traditionally reselling telecommunication products. The scenario is a multi-step (110, 120, 130, 140, and 150) one involving numerous interpersonal interactions with a diverse set of factors.

Step 1 is a step 110 to establish a reselling capability. In this step, a reseller 102 can interact with one or more carriers 104 to become an authorized reselling agent for that carrier 104. This involves the reseller 102 providing numerous requirements, certifications, and meeting sales thresholds, in return for being able to market carrier 104 services for a commission. The rate of the commission being typically fixed by the carrier 104. For each new carrier 104 that the reseller 102 wishes to represent to potential customers, this process 116 must be repeated. Overhead involved in this process is a natural limiter on a number of carriers 104, which a reseller 102 can reasonable represent. The reseller 102 is also formed to maintain 118 a set of carrier required reports, government certifications, and minimum thresholds with each carrier 104, which can vary by carrier 104 established rules.

Once a reseller 102 has established an ability to resell carrier provided communication services, the reseller 102 must solicit 120 a set of customers 120, which are typically relatively large business enterprises 106. The reseller 102 must analyze the needs of each enterprise 106 and develop one or more packaged solution to meet these needs. An enterprise 106 can select one of these solutions, which is optionally customized by the reseller 102. Each different enterprise 106 requires similar handling 122, which consumes a substantial amount of reseller 102 time. The reseller 102 faces challenges 124 of adapting solutions to handle changing needs of the enterprises 106 it serves, of adapting solutions as details of the carrier's 104 service packages change, and to generally manage relationships with multiple enterprise 106 agents.

Upon reaching tentative agreements, a contract stage 130 begins, where a reseller 102 has to establish contracts between enterprises 106, and the carriers 104 that provide the communication services. These contracts 130 can also involve coordination with installation teams 101, hardware venders 103, and different attorneys 107 representing any of the involved parties 101-106. The contracting stage 130 has challenges 132 of contracting costs, coordination costs, and timeline management.

Once contracts are established, a provisioning/installation 140 stage follows. Here, the reseller 102 coordinates with the enterprises 106, the carriers 104, the installation teams 101, and/or hardware venders 103 to insure contract terms are satisfied and the desired services are provided to the enterprise customers in a timely fashion. The generally challenges 142 of expectation management, coordination management, and resolving problems among parties 101-106 occur in the provisioning stage 140.

After installation, enterprises 150 receive the services from the carriers 104 for which they contracted. The reseller must ensure that the enterprises 106 receive usage reports and bills and make the appropriate payments. The usage information and base bills come from the carrier 104 who the reseller 102 may pay after receiving compensation from the enterprise 106 or whom the enterprise 106 may pay directly. Direct interactions between enterprises 106 and carriers 104 are dangerous to the reseller 102, as he/she can be circumvented easily in that situation. The reseller 102 is often forced to consolidate bills from multiple different carriers 104 and to format them into a single bill for the service receiving enterprises 106. The reseller 102 can often attempt to brand the reports/bills with his/her own label at this time. This process, however, is challenging 152 due to administrative expenses to continuously consolidate bills, transcription errors, and administrative delays. Looking at the conventional communication reselling scenario 100, it is easy to see that control is largely maintained by the carriers 104 and that resellers 102 are precariously positioned. Further, options available to enterprise 106 customers are limited and largely dictated by dominant carriers 104.

SUMMARY OF THE INVENTION

The present invention discloses an end-to-end software product for enterprises and telecom distributors for interactions involving one or more service providing carriers. The software product includes up to six distinct and integrated components, which include a service quoting component (e.g., telequote), a contract management component (e.g., contract manager), an order monitoring component (e.g., orderview), an invoice management component (e.g., revenue manager), an expense management and utilization component (e.g., telecom expense management), and a maintenance component. Using the end-to-end product, an enterprise or reseller can select a set of desired telecommunication services from one or more carriers, can contract for the services, and can manage the order process, all from a Web based interface without needing to interact with human agents. After a contract is established, online invoices, usage reports, and the like can be managed online by the end-to-end product. When a telecom distributor is involved, Web based views can be provided customized for both an end-customer and the distributor, where customer facing information is branded using a distributor's private label. The distributor can optionally hide underlying distributor costs from the end-customer using the end-to-end software product.

The present invention can be implemented in accordance with numerous aspects consistent with the material presented herein. For example, one aspect of the present invention can include a software based system for end-to-end handling of communication services that includes a set of Web based interfaces renderable within a standard Web browser served over a network from a Web server to remotely located clients. The set of Web interfaces can permit a user to view, search and select a set of communication services of different providers, each service being presented with a real-time price for the service. Contracts can be automatically generated for selected ones of the communication services. The contracts can specify the real-time price for each service. An order status of the communication services can be monitored using the set of Web based interfaces. Invoices can be generated for the communication services. When different providers provide the communication services, a single integrated bill can be provided for services of the different providers. Usages of the communication services can be viewed online by selectable user categories, which decompose into per-user usage entries. In one embodiment, the software based system can be associated with a wholesale carrier, which receives communication services from the different providers at wholesale rates and which resells these wholesale services. The wholesale carrier can provide the set of Web interfaces as part of a value added service to customers, which can include enterprises and resellers.

Another aspect of the present invention can include a system for handling communication services. The system can include a quote engine, a contract engine, an order engine, an invoice engine, a utilization engine, and a maintenance engine. The quote engine can be configured to ascertain real-time quotes for communication services provided by different service providers. The contract engine can automatically generate contracts for a set of communication services at rates quoted by the quote engine. The order engine can manage a set of configurable milestones and to determine a status of each milestone, wherein the milestones are associated with orders resulting from contracts generated by the contract engine. The invoice engine can create invoices for usages of communication services that were ordered and monitored using the order engine. The utilization engine can manage usages of the invoiced communication services by categories, which decompose into per-user usage entries. The maintenance engine can permit customers to initiate trouble tickets and to receive status to existing trouble ticket submissions. Trouble tickets can be any submission that specifies a service problem, which is to be followed up by a service agent. The engines can each be software engines written as a set of programmatic instructions stored in a machine readable media that are executable by a server-side computing device. A Web server can also be included in the system that serves Web pages that permits authorized remotely located users to interact with the engines. Further, a server side data store can store a set of reports generated by the engines and can make these reports accessible to users via the served Web pages. The reports can include service quote reports, contracts, order status reports, invoices, utilization reports, and maintenance reports.

Still another aspect of the present invention can include a method for reselling communication services. The method can include a step of establishing contracts with one or more of service providers for communication services. Service consumers can be permitted to utilize the established contracts to receive a set of communication services from the service providers in accordance with separate contracts details of which are inaccessible to the service providers. The set of communication services for particular ones of the service consumers can include different services provided by different service providers. Each of the service consumers can be periodically presented with a single integrated bill for periodic charges incurred for the set of communication services during a period. Payment indicated within each of the bills can be payable to a single entity. Each of the service consumers can be presented with an expense and utilization report for communication services used within a user specified period. The set of services for a consumer can be selected using a real-time quoting interface. A contract interface can generate contracts for the consumers that include the selected interface. Orders related to a contracted set of services can be tracked using an order interface. The quoting interface, the contract interface, the order interface, the billing interface, and the expense and utilization interface can be Web interfaces of a single integrated system that provides automated end-to-end handling of the communication services. Resellers can be optionally involved with the integrated system, in which case the system can abstract reseller paid costs for the communication services and can abstract service provider specifics from the service consumers.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 2:
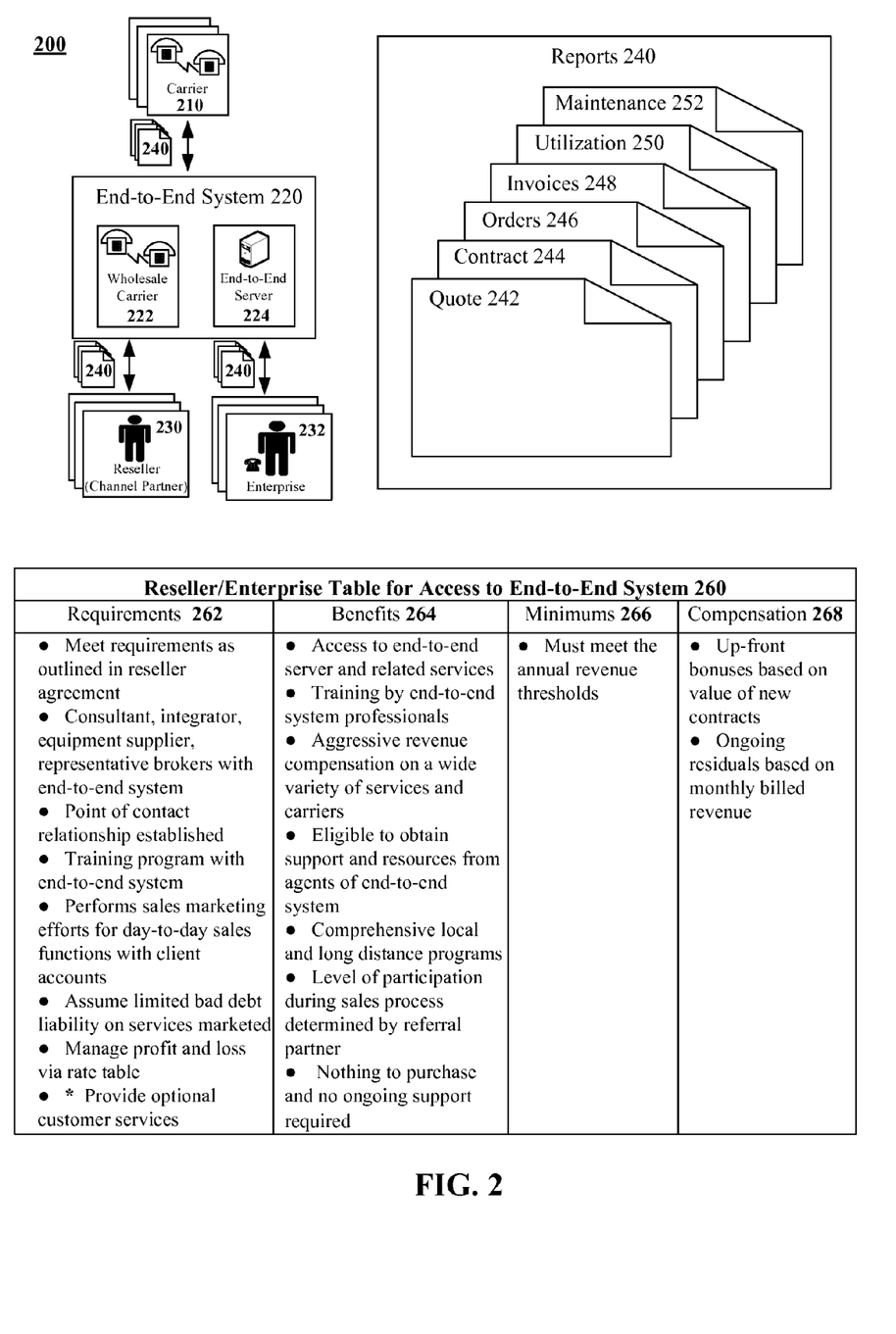
FIG. 2 is a schematic diagram of a system showing end-to-end system for handling telecommunication resources for resellers and enterprises in accordance with an embodiment of the inventive arrangements disclosed herein.

FIG. 2 is a schematic diagram of a system 200 showing end-to-end system 220 for handling telecommunication resources for resellers 230 and enterprises 232 in accordance with an embodiment of the inventive arrangements disclosed herein. In system 200, the end-to-end system 220 functions as an intermediary between multiple service selling carriers 210, resellers 230, and/or enterprises 232. The end-to-end system 220 includes a wholesale carrier 222 and an end-to-end server 224 for handling administrative details relating to telecommunication resources.

The wholesale carrier 222 can be a licensed company (e.g., network operator) able to markup communication services for voice and data. Generally, the wholesale carrier 222 will purchase services from other carriers 210 in volume at favorable pricing. The wholesale carrier 222 can, but need not, utilize a set of carrier 222 owned infrastructure assets in addition to re-selling services provided by other carrier 210 infrastructures. Resellers 230 and enterprises 232 can directly contract for services from the wholesale carrier 222. The end-to-end server 224 can centrally handle reseller 230 and enterprise 232 services and can provide each 230-230 with professional, timely, consolidated, and customized reports 240 for all services. The reports 240 can, for example, include real-time quotes 242 for new communication services 242, contracts 244, order status reports 246, billing reports 248, usage reports 250, and maintenance reports 252. Traditionally, these reports 240 have required intensive administrative effort and have not been available through a single central agency.

Each of the reports 240 can conform to customizable standards and requirements of carriers 210, channel partners 230, and enterprises 232. For example, the reports 240 can automatically be generated in .PDF, EXCEL, XML, ASCII, comma delimited, and other standard formats as well as customized formats specific to an end-user. Additionally, each of the reports 240 can be Web accessible and printable reports.

In one implementation, the involved agencies 210, 230, 230 can configure different delivery preferences for the reports 240, such as through email, fax, postal mail, and the like. Further, the server 224 can optionally interface with carrier 210, reseller 230, and/or enterprise 232 system to directly and dynamically exchange electronic information (e.g., database to database exchanges).

The communication environment established in system 200 that includes end-to-end system 220 produces a vastly difficult results than a traditional environment. Basically, the end-to-end system 220 is an intermediary that assists resellers 230 and enterprises 232 by forcing carriers 210 towards an economically efficient and competitive market, where without system 210 the market imposes numerous barriers that hinder market efficiency. In other words, the end-to-end system 220 functions as a one-stop-shopping venue, which empowers resellers 230 and/or enterprises 232 to an extent never before possible. Historically, carriers 210 have operated in a "heavy-handed" fashion requiring high minimum volumes outside the scope of many smaller resellers 230 and enterprises 232. Even if these minimums could be met, the resellers 230 and enterprise customers 230 were unable to meet the requirements of multiple different carriers 210. Carrier 210 required regulations, complex contracts, and other hurdles also have prevented resellers 230 and enterprises 232 from using competitive offerings of other carriers 210. Economically, the carriers 210 have wanted to protect their "retail" markets by maintaining stringent and difficult requirements for reselling and wholesaling services, which is understandable as this approach has historically realized the highest overall profits for the carriers 210.

Further, the "volume discounts" and "commissions" offered by carriers 210 have historically been dictated in a take-it-or-leave-it fashion. Resellers 230 have been offered XX percent commission for services provided to enterprises 232 and enterprises 232 have been offered a discount of XX amount. These commission percentages and discount amounts are subject to change at a whim of the carriers 210. Further, as lucrative markets are forged through the hard work of resellers 230, carriers 210 often circumvent the reseller 230 (since enterprise specific details are generally visible to the carrier 210) and negotiate with the enterprise 232 directly, thus eliminating reseller 230 commission. Otherwise, the carrier 210 could historically force the reseller 230 to accept a lower than original commission, under a threat of direct contact with the enterprise 232. Further, it is common for resellers 230 to only receive a customer origination fee, with little or no residuals for continuing service between the carrier 210 and enterprise 232 over time.

In system 200, however, the end-to-end system 220 effectively abstracts details concerning reseller 230 contracts from the service providing carrier 210. Instead of being limited to a fixed commission, the reseller 230 can purchase services from the wholesale carrier 222 at quoted (242) rates, which generally are a slightly marked up fee from that charged by an infrastructure owning carrier 210. The wholesale carrier 222 manages relationships with multiple carriers 210 in volume, which permits the reseller 230 to create a cafeteria plan of services from any carrier 210, depending upon the most favorable offerings from the reseller's perspective. The reseller 230 can establish any rate for an overall communication package that an enterprise 232 is willing to pay. For this reason, in system 200, resellers 230 can be referred to as channel partners instead of as salespeople or resellers 230 in a conventional sense. A channel partner 230 is able to operate their own reselling business with the assistance of system 220 on partner established terms. Channel partners 230 can have numerous reselling agents which receive commissions for sales from the channel partners. The system 220 can be configured by the channel partners 230 for interfaces specific to reselling agents.

Channel partner 230 (e.g. reseller 230) determined rates can be entered into the server 224, which generates contracts 244 between the wholesale carrier 222 and the service providing carrier(s) 210, between the wholesale carrier 222 and the reseller 230, and between the reseller 230 and the enterprise 232. The contracts 244 can be automatically generated, and can be customized by the parties involved, so that they conform to a specific desired format. For example, each carrier 210 can have their own contractual standards, which carrier 210 specific contracts must conform to. The channel partners 230 can desire a specific format, branding, and the like for contracts 244 generated by server 224 for enterprise 232 customers.

All involved parties 210, 230, 232 can be provided with updated reports for the order 246 status. The order 246 status information can also be provided to additional interested parties, such as hardware venders, installers, and the like. The system 224 produces billing 248 statements to resellers 230 and enterprises 232 alike. A single, integrated bill 248 can be provided regardless of how many different carriers 210 are actually providing services. Further, reseller 230 established billing criteria can be used for billing enterprises 232. Additionally, the bill presented to the enterprise 232 can be branded with reseller 230 identifying marks, such as a reseller logo, address, contact information, and the like. At any point in time, the enterprise 232 and/or the reseller 230 can access usage 250 information provided directly by the server 224. Further, customers can initiate trouble tickets via the end-to-end system 220. Trouble tickets can be any submission that specifies a service problem, which is to be followed up by a service agent. Maintenance reports 252 can be generated that contain trouble ticket and/or maintenance related information. The above presented scenario is able to be conducted between the enterprise 232 and end-to-end system 220 directly without channel partner 230 involvement.

In system 200, a set of requirements represented by table 260 may be established for resellers 230 and enterprises 232 wishing to interact with end-to-end system 220. Table 260 is presented as a sample to illustrate requirements 262, benefits 264, minimums 266, and compensation 268 available to resellers 230 in one implementation of system 200. Table 260 is not to be construed as a limitation of system 200. For example, specifics for enterprise 232 customers will vary from those of the sample, which is tailored for resellers 230.

Table 260 shows that some of the requirements 262 for a reseller 230. As listed requirements 262 include: resellers must meet requirements established by a reseller agreement, various parties working with the reseller 230 should be authorized by the reseller 230 to interact with system 200 (e.g., consultants, integrators, equipment suppliers, representatives, etc.), point of contact relationships with an agent of the end-to-end system 220 should be established by each reseller 230, resellers 230 and agents of resellers 230 should be trained to use and interact with the end-to-end system, resellers 230 are to be responsible for sales and marketing efforts for day-to-day sales functions and customer relationship management issues, resellers 230 are to insure the end-to-end system 220 up to at least a minimum threshold against potential bad debt for services rendered to enterprises 232 for which the resellers 230 are responsible, resellers 230 are to manage profits and losses as assisted by invoices 248 provided by system 220, and optional customer service operations (e.g., equipment maintenance, troubleshooting, additional training, etc.) are to be the responsibility of the resellers 230. Some of the benefits 264 received by the resellers 230 include: access to the end-to-end server 224, reports 240, and related system 220 services, training by end-to-end system 220 professionals, aggressive revenue compensation on a wider variety of services and carriers 210 than otherwise possible, eligibility to obtain support and resources form agents of the end-to-end system 220, comprehensive local and long distance programs, when engaged in a subordinate hierarchy of resellers—a referral partner (e.g., top node in the hierarchy) can indicate a level of participation during a sales process to subordinate hierarchy nodes, resellers 230 are not required to purchase carrier specific 210 items and have no ongoing support obligations imposed upon them. The minimums 266 for being a reseller can be to meet or exceed annual revenue thresholds. Resellers 230 can be compensated 268 through up front bonuses based on a value of new contracts, through ongoing residuals based on monthly billing revenue, and compensation ratios can be negotiated and determined by the reseller's themselves.

Figure 3:
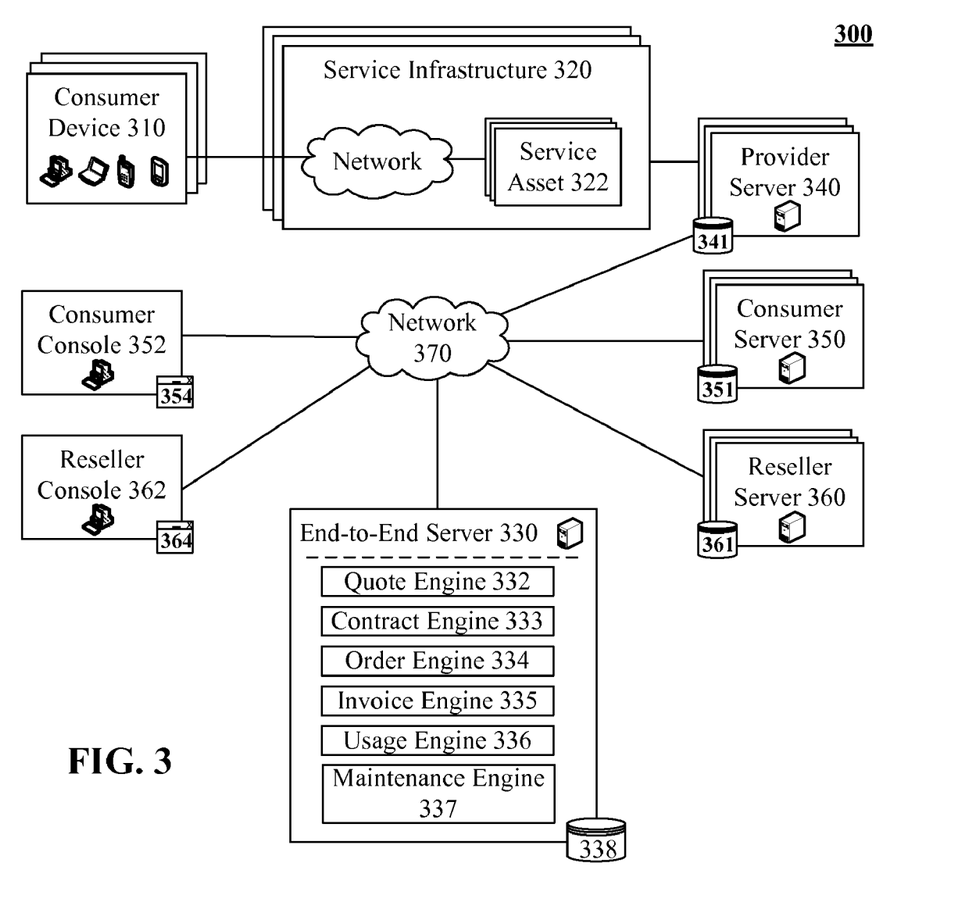
FIG. 3 is a schematic diagram of a system for handling end-to-end communication services in accordance with an embodiment of the inventive arrangements disclosed herein.

FIG. 3 is a schematic diagram of a system 300 for handling end-to-end communication services in accordance with an embodiment of the inventive arrangements disclosed herein. System 300 can represent one potential hardware arrangement for a system 200.

In system 300, a number of customers can contract to receive communication services (e.g., data, telephony, television, and other media services), which enable consumer devices 310 to use service assets 322 and network resources 324 that are part of a communication service infrastructure 320 owned or operated by one or more providers. Each provider can be associated with different network 324 (e.g., wireless network, telephony network, data network, cable network) and with different service assets 322, which are used to provide the communication services to the devices 310. Each individual provider can have a set of provider servers 340, which monitor and enable devices 310 to use the service infrastructure 320. Provider maintained information can be stored in a set of provider data stores 341 in a provider specific format.

An end-to-end server 330 can be used to help manage the various details associated with providing the communication services to the consumer devices 310. For example, in one implementation, the end-to-end server 330 can reconcile the different information formats used by providers 341 and store all provider data in a provider independent format in data store 338. Optional format conversations can also be implemented to permit the end-to-end server 330 to interface with data in data store 351 related to consumer servers 350 maintained by enterprises receiving services via the devices 310 and to interface with data stored in data stores 361 of reseller servers 360 that market and sell services used by the devices 310. The end-to-end server 330 can include a Web serving capability, which permits consumer consoles 352 and reseller consoles 362 executing browsers 354, 364 to access engine 332-337 processed content via network 370. The content produced by engines 332-337 can include numerous customized reports, such as the reports 240 described in system 200.

Reseller and/or enterprise profiles can be established with the end-to-end server 330. These profiles can include configurable preferences, such as report preferences. One preference can permit re-branding of communication services for a reseller's brand. Report generating interfaces can include auto population capability, which ensures that reoccurring information needs to be entered only once, which saves significant time. Reseller's can also establish what information is to be visible to service consumers via the server 330. Rate and usage information related viewable by consumers via console 352 can be adjusted in accordance with reseller established preferences. For example, an enterprise customer of a reseller can be presented with an interface branded for the reseller when accessing server 330 through browser 354 and rates shown can be retail rates specified by the reseller. Resellers and enterprise customers can be permitted to store server 330 specific documents in data store 338, which includes manually edited and/or annotated documents derived from automatically generated reports. Use of the engines 332-337 permits resellers to focus upon core competencies and interpersonal sales relationships instead of administrative and coordination issues of communication service reselling. Enterprises can directly wholesale for services using the end-to-end server 330 to handle a significant portion of the management, oversight, coordination, and administrative overhead.

The engines 332-337 of the end-to-end server 330 can include a quote engine 332, a contract engine 333, an order engine 334, an invoice engine 335, a usage engine 336, and a maintenance engine 337. The quote engine 332 can provide real-time Web based quoting of available communication services. The quote engine 332 can instantly generate complete quotes for complex services including dial-tone, wireless telecommunications, and data networks. When offerings of the service providers 340 change, these changes can be electronically conveyed to data store 338, where they are automatically formatted for use by the quote engine 332. The quote engine 332 can organize different communication services by service category, location, performance requirements, price, provider, user satisfaction ratings, and other criteria. Further, a user can input a set of desired conditions or services, which is searched against available services to produce a set of matching results. The quote engine 332 can empower a front-end interface, which permits a user to view, search, and select a set of desired communication services.

The quote engine 332 can save resellers time by storing editable default sales language, which is placed within reports generated by the quote engine 330. Automated reports generated by the engine 332 can be edited (as can any of the reports from any of the engines 332-336) by a console 352, 362 user and stored in data store 338. Users can also store a set of email addresses for customers/agents in a stored (338) profile, which can be selected from a quote interface. Thus, a reseller 362 or consumer 352 can use a quote interface to generate, edit, and send quotes (via email or other specified delivery mechanism) to report consumers. The quote engine 332 can also track pending quotes, proposals, responses due, and the like. A schedule manager can permit users to establish follow-on events with are associated with auto-notifications. Further, historical collaboration threads relating to quotes/proposals/contracts and the like can be managed and maintained by the server 330.

The contract engine 333 can be a paperless contract management software program that assembles all artifacts needed for contracts between resellers and service providers, between resellers and enterprises, and between enterprises and an end-to-end system. The contract engine 333 can automatically include all legal clauses needed for selected services. The legal clauses can be customized to suit the needs of specific resellers, and/or enterprises. The contract engine 333 can be integrated with the quote engine 332 so that contracts for quoted services are automatically generated without requiring redundant data entries. Contracts generated by the engine 333 can be stored in data store 338 and collaboratively edited by contract participants.

The ordering engine 334 can permit involved parties to monitor progress of all orders. The ordering engine 334 can be integrated with the quote and contract engines 332-333. The ordering engine 334 permits a set of configurable milestones to be established and monitored. Automated notifications can be established against these milestones, which are triggered by status changes. The milestones handled by the ordering engine 334 can include, but are not limited to order received milestones, order confirmation, credit verification of a recipient, installation schedule establishment, installation/provisioning milestones, and the like.

The invoice engine 335 can handle billing and invoices relating to communication services. The invoice engine 335 can generate reseller specific invoices and consumer specific invoices. All the invoices generated by the engine 335 can be consolidated from multiple sources (e.g., different providers). Thus, the invoice engine 335 can cause the server 330 to function as a single billing entity, capable of abstracting service specific details from service consumers as desired by a reseller. Different billing interfaces can be integrated with the invoice engine 335, such as interfaces for small businesses, corporate businesses, multi-location businesses, resellers, and reseller agents. The invoice engine 335 can manage commissions for resellers using reselling agents that receive commission based revenue. Hardware costs, installation costs, provisioning costs, and the like can all be handled by the invoice engine 335. The invoice engine 335 can track and identify any number of billable elements organized within an element hierarchy. For example, a hierarchy used by the invoice engine 335 can be organized as follows: reseller identifier, sub agency identifier, sub agency employee identifier, customer account number, product (recurring and install fees), usage (metered or usage sensitive), access type (switched/dedicated), and jurisdiction (domestic, international, surcharges). Like other engines of server 330, the invoice engine 335 can be integrated with other engines 332-334 so that billing is automatically initiated for orders and contracts established using the end-to-end server 330.

The usage engine 336 can be an expense management engine that permits all service related equipment and usages to be tracked. The tracking can be categorized by user, location, department, and the like. The usage engine 336 can be used for wire line and wireless services. Usage/cost thresholds can be configured within data store 338, which are triggered when the usage engine 336 determines a threshold is exceeded. Different configurable notifications can be sent to resellers, users, supervisors, and the like to automatically notify suitable individuals of abnormal activities. Variances between bills generated by invoice engine 335 and the usages handled by the usage engine 336 can be flagged in one implementation. Additionally, the usage engine 336 can generate monthly trending reports for customer's general ledgers and accounts payable systems.

The maintenance engine 337 can be used to in-process and handle service problems or issues. Maintenance engine 337 can include a customer problem reporting interface through which customers can initiate trouble tickets and can receive a status on the same. Submitted trouble tickets can initiate scheduled actions by agents to resolve the reported problem. The maintenance engine 337 allows a customer base full service access and self-care/statusing capability to any products and services handled by engines 332-336.

As shown in system 300, the consumer devices 310 can include any device capable of receiving a communication service. The devices 310 can include customer presence equipment (CPE), private branch exchange switches, telephones, mobile phones, hubs, personal computers, servers, video teleconferencing systems, mobile email devices, mobile computing devices, and the like.

Networks 324 and 370 can include components capable of conveying digital content encoded within carrier waves. The content can be contained within analog or digital signals and conveyed through data or voice channels and can be conveyed over a personal area network (PAN) or a wide area network (WAN). The networks 324 and 370 can include local components and data pathways necessary for communications to be exchanged among computing device components and between integrated device components and peripheral devices. The networks 324 and 370 can also include network equipment, such as routers, data lines, hubs, and intermediary servers which together form a packet-based network, such as the Internet or an intranet. The networks 324 and 370 can further include circuit-based communication components and mobile communication components, such as telephony switches, modems, cellular communication towers, and the like. The networks 324 and 370 can include line based and/or wireless communication pathways.

The data stores 338, 341, 351, and 361 can be physically implemented within any type of hardware including, but not limited to, a magnetic disk, an optical disk, a semiconductor memory, a digitally encoded plastic memory, a holographic memory, or any other recording medium. Each of the data stores 338, 341, 351, and 361 can be a stand-alone storage unit as well as a storage unit formed from a plurality of physical devices which may be remotely located from one another. Additionally, information can be stored within each of the data stores 338, 341, 351, and 361 in a variety of manners. For example, information can be stored within a database structure or can be stored within one or more files of a file storage system where each file may or may not be indexed for information searching purposes. Information stored in data store 338, 341, 351, and 361 can also be optionally encrypted for added security.

It should be appreciated that system 300 represents one contemplated arrangement of elements and that alternative and derivative arrangements are contemplated. For example, although the various engines 332-337 are shown as being provided by a single server 330, in one implementation different ones of the engines 332-337 can be provided by a set of distributed servers. For instance, the quote engine 332 can be implemented by one server, the contract engine 333 and order engine 334 can be implemented by another server, and the invoice and usage engines 336 by yet another server.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A system for end-to-end handling of communication services comprising:
    a web server remotely located to clients and configured to serve, over a network, a set of web interfaces renderable within a standard web browser, wherein said set of web interfaces are configured to:
        permit a user to view, search, and select a set of communication services of different providers, each service being presented with a real-time price for the service;
        automatically generate contracts for selected ones of the communication services, wherein said contracts specify the real-time price for each service;
        monitor an order status of communication services selected and contracted for using the set of Web based interfaces;
        generate invoices related to the communication services, wherein when a plurality of different providers provide the communication services, a single integrated bill is provided for services of the different providers;
        view usages of the communication services online by selectable user categories, which decompose into per-user usage entries; and
    a server-side data store configured to establish user specific profiles, wherein each of the set of Web based interfaces use customization settings established within the server-side data store, wherein the customization settings change presentation aspects of the Web based interfaces, wherein the details specific to the resellers and the service consumers are hidden from the different service providers, and wherein the set of interfaces are configured to be used by resellers who select, contract for, order, receive, and manage communication services using the set of Web based interfaces, wherein the resellers are permitted to establish rates via the Web based interfaces which service consumers contracting with the resellers are to pay, wherein the set of Web based interfaces comprise a consumer version of the interfaces that generates invoices and permits consumers to view usages in accordance with the reseller established rates, and wherein the resellers are permitted to enter reseller's branding elements, wherein the consumer version of the interfaces are branded in accordance with the reseller's branding elements, and wherein different ones of the user specific profiles are for different service consumers of the resellers, and wherein the set of interfaces permit the resellers to establish profiles for a set of reselling agents, who receive at least one of commissions and sales based compensation from the reseller associated with the communication services, wherein the set of Web based interfaces generate invoices for the commissions in accordance with reseller established criteria, wherein the reselling agents are granted selective access to the Web based interfaces in accordance with permissions established by the reseller, for whom the reselling agent is a representative.

2. The system of claim 1, wherein users are permitted to use the set of Web based interfaces to select, contract for, order, receive, and manage communication services through a Web browser without directly interacting with human agents.

3. The system of claim 1, wherein the software based system is associated with a wholesale carrier, which receives communication services from the different providers at wholesale rates and which resells these wholesale services, wherein said wholesale carrier maintains data presented within the set of Web based services using computing systems associated with the wholesale carrier, wherein the real-time price is a price charged by the wholesale carrier, wherein the generated contracts are between a user designated entity and the wholesale carrier, wherein the invoices comprise amounts owed to the wholesale carrier for the communication services.

4. The system of claim 3, wherein the wholesale carrier permits enterprises to directly select, contract for, order, receive, and manage communication services using the set of Web based interfaces.

5. The system of claim 3, wherein the wholesale carrier permits resellers to select, contract for, order, receive, and manage communication services using the set of Web based interfaces, wherein the resellers are permitted to establish rates via the Web based interfaces which service consumers are to pay, wherein the set of Web based interfaces comprise a consumer version of the interfaces that generates invoices and permits consumers to view usages in accordance with the reseller established rates, and wherein the resellers are permitted to enter reseller's branding elements, wherein the consumer version of the interfaces are branded in accordance with the reseller's branding elements.

6. The system of claim 3, wherein consumer specific details related to the communication services associated with the set of Web based interfaces are abstracted from the different providers of the communication services, wherein the different providers provide the communication services under high-volume contracts between an entity other than that which permits the communication services to be contracts for via the set of Web based interfaces.

7. The system of claim 1, wherein said set of Web based interfaces are able to dynamically generate a plurality of reports, said reports comprising service quote reports, contracts, order status reports, invoices, and utilization reports, wherein each of these reports are stored and maintained within a server-side data store accessible via the set of Web based interfaces.

8. The system of claim 7, wherein each of the reports are editable by users and wherein users are able to store edited versions of the reports in the server-side data store.

9. A software based system for end-to-end handling of communication services comprising:
a web server remotely located to clients and configured to serve, over a network, a set of web interfaces renderable within a standard web browser, wherein said set of web interfaces are configured to:
permit a user to view, search, and select a set of communication services of different providers, each service being presented with a real-time price for the service;
automatically generate contracts for selected ones of the communication services, wherein said contracts specify the real-time price for each service;
monitor an order status of communication services selected and contracted for using the set of Web based interfaces;
generate invoices related to the communication services, wherein when a plurality of different providers provide the communication services, a single integrated bill is provided for services of the different providers;
view usages of the communication services online by selectable user categories, which decompose into per-user usage entries; and
a server-side data store configured to establish user specific profiles, wherein each of the set of Web based interfaces use customization settings established within the server-side data store, wherein the customization settings change presentation aspects of the Web based interfaces, wherein the details specific to the resellers and the service consumers are hidden from the different service providers, and wherein the set of interfaces are configured to be used by resellers who select, contract for, order, receive, and manage communication services using the set of Web based interfaces, wherein the resellers are permitted to establish rates via the Web based interfaces which service consumers contracting with the resellers are to pay, wherein the set of Web based interfaces comprise a consumer version of the interfaces that generates invoices and permits consumers to view usages in accordance with the reseller established rates, and wherein the resellers are permitted to enter reseller's branding elements, wherein the consumer version of the interfaces are branded in accordance with the reseller's branding elements, and wherein different ones of the user specific profiles are for different service consumers of the resellers, wherein the details specific to the resellers and the service consumers are hidden from the different service providers.

10. The system of claim 9, wherein users are permitted to use the set of Web based interfaces to select, contract for, order, receive, and manage communication services through a Web browser without directly interacting with human agents.

11. The system of claim 9, wherein the software based system is associated with a wholesale carrier, which receives communication services from the different providers at wholesale rates and which resells these wholesale services, wherein said wholesale carrier maintains data presented within the set of Web based services using computing systems associated with the wholesale carrier, wherein the real-time price is a price charged by the wholesale carrier, wherein the generated contracts are between a user designated entity and the wholesale carrier, wherein the invoices comprise amounts owed to the wholesale carrier for the communication services.

12. The system of claim 11, wherein the wholesale carrier permits enterprises to directly select, contract for, order, receive, and manage communication services using the set of Web based interfaces.

13. The system of claim 11, wherein the wholesale carrier permits resellers to select, contract for, order, receive, and manage communication services using the set of Web based interfaces, wherein the resellers are permitted to establish rates via the Web based interfaces which service consumers are to pay, wherein the set of Web based interfaces comprise a consumer version of the interfaces that generates invoices and permits consumers to view usages in accordance with the reseller established rates, and wherein the resellers are permitted to enter reseller's branding elements, wherein the consumer version of the interfaces are branded in accordance with the reseller's branding elements.

14. The system of claim 11, wherein consumer specific details related to the communication services associated with the set of Web based interfaces are abstracted from the different providers of the communication services, wherein the different providers provide the communication services under high-volume contracts between an entity other than that which permits the communication services to be contracts for via the set of Web based interfaces.

15. The system of claim 9, wherein said set of Web based interfaces are able to dynamically generate a plurality of reports, said reports comprising service quote reports, contracts, order status reports, invoices, and utilization reports, wherein each of these reports are stored and maintained within a server-side data store accessible via the set of Web based interfaces.

16. The system of claim 15, wherein each of the reports are editable by users and wherein users are able to store edited versions of the reports in the server-side data store.

17. A method for end-to-end handling of communication services using a set of Web based interfaces renderable within a standard Web browser served over a network from a Web server to remotely located Web clients and using a server-side data store configured to establish user specific profiles, said method comprising:
  permitting a user to view, search, and select a set of communication services of different providers, each service being presented with a real-time price for the service;
  automatically generating contracts for selected ones of the communication services, wherein said contracts specify the real-time price for each service;
  monitoring an order status of communication services selected and contracted for using the set of Web based interfaces;
  generating invoices related to the communication services, wherein when a plurality of different providers provide the communication services, a single integrated bill is provided for services of the different providers; and
  viewing usages of the communication services online by selectable user categories, which decompose into per-user usage entries, wherein each of the set of Web based interfaces use customization settings established within the server-side data store, wherein the customization settings change presentation aspects of the Web based interfaces, wherein the details specific to the resellers and the service consumers are hidden from the different service providers, and wherein the set of interfaces are used by resellers who select, contract for, order, receive, and manage communication services, wherein the resellers establish rates via the Web based interfaces which service consumers contracting with the resellers are to pay, wherein the set of Web based interfaces comprise a consumer version of the interfaces that generates invoices and permits consumers to view usages in accordance with the reseller established rates, and wherein the resellers enter reseller's branding elements, wherein the consumer version of the interfaces are branded in accordance with the reseller's branding elements, and wherein different ones of the user specific profiles are for different service consumers of the resellers, wherein the details specific to the resellers and the service consumers are hidden from the different service providers.

18. The method of claim 17, wherein users are permitted to use the set of Web based interfaces to select, contract for, order, receive, and manage communication services through a Web browser without directly interacting with human agents.

19. The method of claim 17, wherein the software based system is associated with a wholesale carrier, which receives communication services from the different providers at wholesale rates and which resells these wholesale services, wherein said wholesale carrier maintains data presented within the set of Web based services using computing systems associated with the wholesale carrier, wherein the real-time price is a price charged by the wholesale carrier, wherein the generated contracts are between a user designated entity and the wholesale carrier, wherein the invoices comprise amounts owed to the wholesale carrier for the communication services.

20. The method of claim 17, wherein said set of Web based interfaces are able to dynamically generate a plurality of reports, said reports comprising service quote reports, contracts, order status reports, invoices, and utilization reports, wherein each of these reports are stored and maintained within a server-side data store accessible via the set of Web based interfaces.

* * * * *